(12) United States Patent
Kunitomo

(10) Patent No.: US 6,792,382 B2
(45) Date of Patent: Sep. 14, 2004

(54) SPIRIT LEVEL

(75) Inventor: Ken Kunitomo, Fukuoka (JP)

(73) Assignee: Sakamoto-Denki-Seisakusho, Co. Ltd., Fukuoka (JP)

( * ) Notice: Subject to any disclaimer, the term of this patent is extended or adjusted under 35 U.S.C. 154(b) by 0 days.

(21) Appl. No.: 10/208,019

(22) Filed: Jul. 31, 2002

(65) Prior Publication Data
US 2003/0182078 A1 Sep. 25, 2003

(30) Foreign Application Priority Data
Mar. 7, 2002 (JP) ........................................ 2002-109808

(51) Int. Cl.⁷ ................................................ G01C 9/06
(52) U.S. Cl. ............................ 702/154; 33/312; 33/366; 340/995
(58) Field of Search ................................ 702/154, 161; 33/366.12, 366.14, 366.16, 366.18, 366.19, 366.22, 366.24, 366.26, 366.27, 348.2, 372, 354, 353, 312; 340/995.21

(56) References Cited

U.S. PATENT DOCUMENTS

| | | | | |
|---|---|---|---|---|
| 4,167,818 A | * | 9/1979 | Cantarella et al. | 33/366 |
| 4,422,243 A | * | 12/1983 | Brunson et al. | 33/366 |
| 4,549,277 A | * | 10/1985 | Brunson et al. | 702/154 |
| 4,614,040 A | * | 9/1986 | Hulsing et al. | 33/312 |
| 4,812,845 A | * | 3/1989 | Yamada et al. | 340/995 |
| 4,912,662 A | * | 3/1990 | Butler et al. | 702/154 |
| 5,083,383 A | * | 1/1992 | Heger | 33/366 |
| 5,313,713 A | * | 5/1994 | Heger et al. | 33/366 |
| 5,479,715 A | * | 1/1996 | Schultheis et al. | 33/366 |
| 5,594,669 A | * | 1/1997 | Heger | 702/154 |
| 5,956,260 A | * | 9/1999 | Heger et al. | 702/154 |
| 6,456,194 B1 | * | 9/2002 | Carlson et al. | 340/440 |

* cited by examiner

Primary Examiner—John Barlow
Assistant Examiner—John Le
(74) Attorney, Agent, or Firm—Staas & Halsey LLP

(57) ABSTRACT

A spirit level has a first inclination sensor, at least one second inclination sensor, and a display to represent an inclination for the at least one second inclination sensor based on an inclination for the first inclination sensor. The display may represent the inclination for the at least one second inclination sensor as an inclination relative to the inclination at the first sensor. At least one of the inclination sensors may have a changing inclination. In this case, the display represents the inclination for the at least one second inclination sensor based on the changing inclination. The inclination sensors may be movable with respect to a remainder of the spirit level. In this case, the inclination sensors may be connected to the remainder of the sprit level with a cable or high frequency radio links.

13 Claims, 5 Drawing Sheets

Xat : TIME DIFFERENCE OF OUTPUT DATA AT POINT a.

----------- INCLINATION SENSOR 1, LOCATION A
--------- INCLINATION SENSOR 2, LOCATION B

SPIRIT LEVEL

CROSS REFERENCE TO RELATED APPLICATIONS

This application is based on and hereby claims priority to Japanese Application No. 2002-109808 filed on Mar. 7, 2002, the contents of which are hereby incorporated by reference.

BACKGROUND OF THE INVENTION

The invention relates to a spirit level, which measures precisely the inclination of a device such as equipment, which performs handling and precise processing of a wafer in a semiconductor factory.

Conventionally, a spirit level shows the inclination by measuring the location of air bubbles in a liquid. Alternatively, a spirit level detects inclination and presents a digital representation of the detected data by measuring the location of mercury within an enclosure.

A spirit level has a sensor to detect the level where the sensor is installed. A spirit level having a digital display indicates the inclination at a portion of the spirit level where the sensor is installed. Therefore, the user can easily know the inclination at the location of the sensor.

However, the above conventional spirit level simply displays the inclination at the part measured. Therefore, when it is necessary to precisely measure the inclination at two or more locations, a difficult problem is presented for the following reasons.

For example, it may be necessary to adjust the level on semiconductor fabrication equipment having a length of some meters. With conventional technology, a user adjusts the level at point A, using a spirit level. After that, the user adjusts the level at point B, which is apart from point A. While measuring the inclination at point B, the inclination at point A may change by natural phenomenon. Therefore, it was difficult to measure the inclination at both point A and point B precisely, and to precisely level the two points relative to one another.

The inclination varies based on natural phenomenon factor and other factors. For example, in connection with marine ebb and flow near the seashore, the level of a building foundation will shift with time. Moreover, if a portion of a building is heated, such as when sunshine hits one side of the building, the heated portion will expand, thereby changing the slope of the floor. Moreover, in a brittle foundation area, adding weight to the building, such as when new equipment is installed, may cause land subsidence.

In view of the changes, it is difficult to precisely adjust the inclination at both point A and point B using conventional equipment. That is, if the level at Point A is measured and adjusted, and then the level at Point B is measured on the basis of the adjusted level at Point A, there may be a change in inclination at Point A between the time of adjusting Point A and adjusting Point B. This makes precise measurement and inclination adjustment difficult.

SUMMARY OF THE INVENTION

One possible object of the invention is to precisely measure the inclination at two or more places.

The present invention provides an inclination sensor having a first inclination sensor, at least one second inclination sensor, and display to represent an inclination for the at least one second inclination sensor based on an inclination for the first inclination sensor. The display may represent the inclination for the at least one second inclination sensor as an inclination relative to the inclination at the first sensor. At least one of the inclination sensors may have a changing inclination. In this case, the display represents the inclination for the at least one second inclination sensor based on the changing inclination. The inclination sensors may be movable with respect to a remainder of the spirit level. In this case, the inclination sensors may be connected to the remainder of the sprit level with a cable or high frequency radio links.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
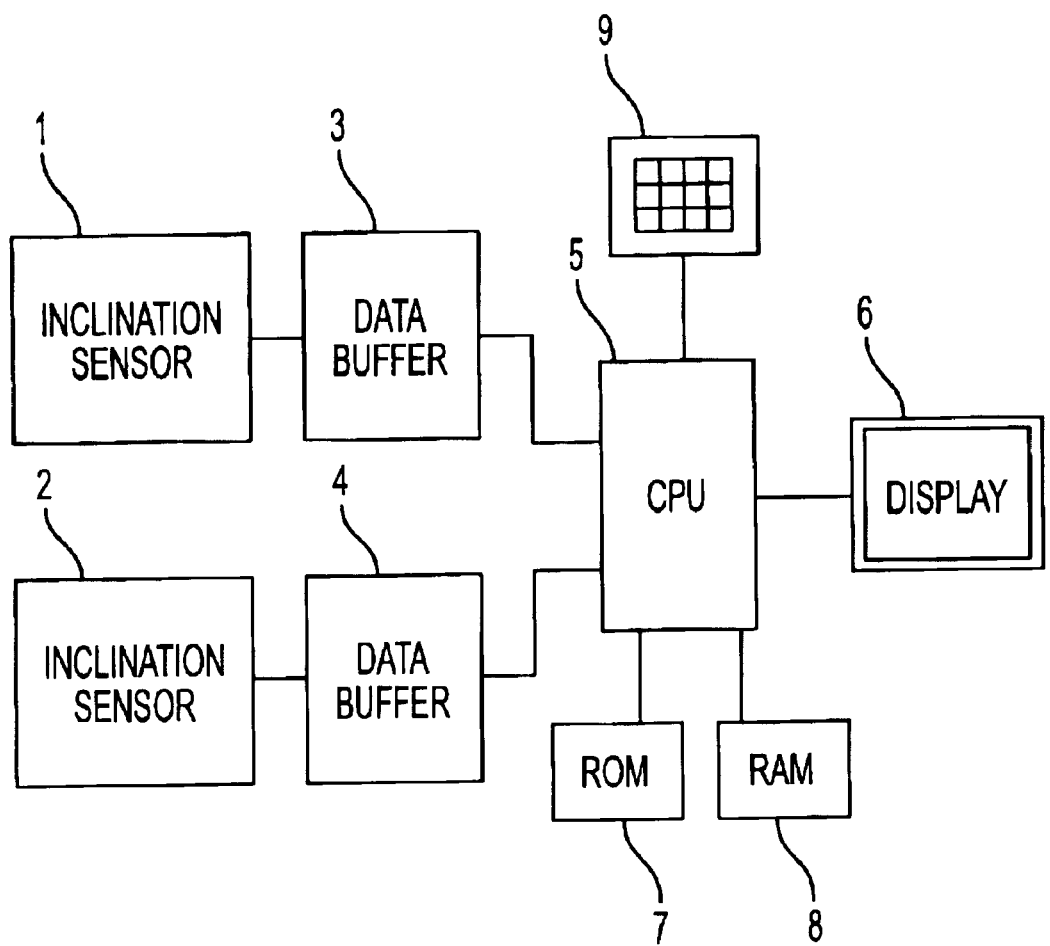
FIG. 1 is a block diagram of circuitry for a spirit level according to one embodiment of the invention.

Reference will now be made in detail to the preferred embodiments of the present invention, examples of which are illustrated in the accompanying drawings, wherein like reference numerals refer to like elements throughout.

FIG. 1 is a block diagram of circuitry for a spirit level according to one embodiment of the invention. The device has inclination sensors 1, 2 and data buffers 3, 4.

The data buffer 3 retains data from the inclination sensor 1, and the data buffer 4 retains data from inclination sensor 2. To communicate the information, the inclination sensors are connected with the data buffers through a cable or high frequency RF connections.

A CPU processes data from the data buffers 3, 4 and produces an output on a display 6 based on the process data. A program to operate the CPU 5 is stored in a Read Only Memory (ROM) 7. A Random Access Memory (RAM) is connected to CPU 5. The RAM temporarily stores data produced during the processing operations of CPU 5. A keyboard 9, for example, can be used input data to the CPU 5.

Figure 2:
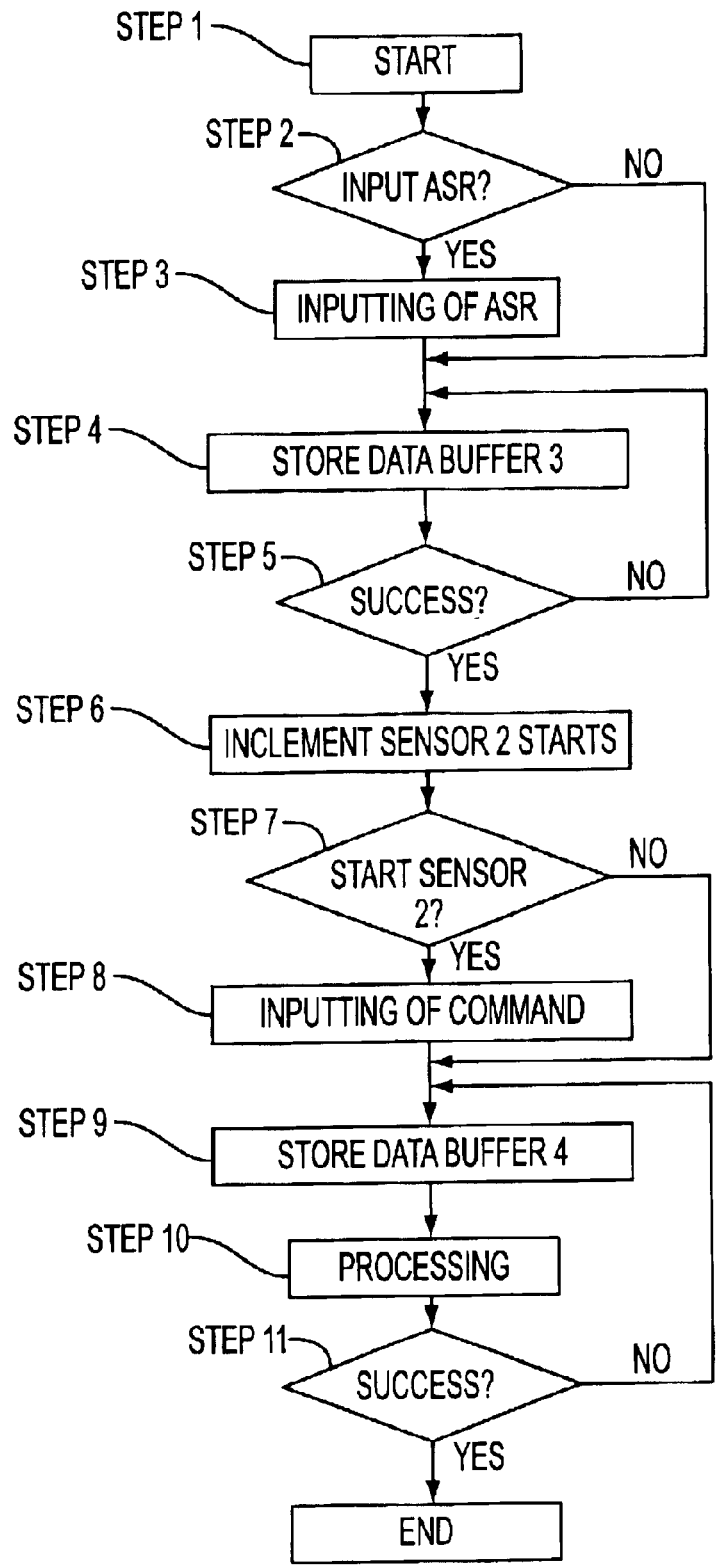
FIG. 2 is a flowchart showing the operation of the spirit level shown in FIG. 1.

FIG. 2 is a flowchart showing the operation of the spirit level shown in FIG. 1. The operation will be described with respect to leveling semiconductor fabrication equipment. Before beginning, the user installs at least the inclination sensor 1 at some part of the equipment, which should be leveled. Next, the user turns on the spirit level and starts the operation (step 1).

Then, after the spirit level starts processing at step 1, it judges whether it is necessary for the user to input an acceptable-standard range (ASR) at step 2. If the ASR has not been input, the method proceeds to step 3 where the ASR is input using the keyboard 9. After the ASR is input, data buffer 3 is overwritten at step 4, and then the method proceeds to step 5.

At step 5, the device determines whether the inclination has been successfully brought within the acceptable-standard range. If not, the method proceeds back to step 4 where the inclination at sensor 1 is stored in data buffer 3. For example, the x-axis inclination may be stored in data buffer 3. The inclination is displayed to the user on the display 6. The user looks at the display, and adjusts the equipment to achieve a "0" reading. That is, the inclination of the semiconductor fabrication equipment, for example, is adjusted where the inclination sensor 1 is installed so as to level the equipment at that location. Until the equipment has been successfully leveled, the user is urged to adjust the inclination. When the equipment has eventually been leveled, the method proceeds to step 6.

Once the inclination sensor 1 outputs a passing value, the user inputs a command at step 6 using the keyboard 6. The command tells the CPU 5 to get data from the sensor 2 positioned at location B.

At step 7, the CPU 5 determines whether it is necessary to obtain a new data range (acceptable-standard range) for the sensor 2. If it is not necessary, for example because the user has already input the data range for sensor 2, inclination adjustment for sensor 2 can start. The method proceeds to step 9. If it is necessary to obtain a new data range for the sensor 2, then the method proceeds to step 8 where the user sets a data range (acceptable-standard range) for the sensor 2.

At step 9, the CPU 5 inputs data from sensor 2 via data buffer 4. To do the second inclination calculation, the CPU 5 uses data from both the sensor 1 and the sensor 2. Thus, the CPU 5 also obtains the data from sensor 1. At step 10, the CPU performs a calculation (described below) to determine whether the inclination at sensor 2 falls within the prescribed data range.

At step 11, the CPU 5 outputs the results of the calculation. Specifically the display 6 shows the user whether the operation values XB and YB for sensor 2 have been brought within the acceptable data range. If sensor 2 is outside of the acceptable range, the user is requested to adjust the inclination. Perhaps this request is made by displaying to the user the magnitude and direction of the error. Until there is success, the CPU loops back to step 9. Once there is success, the method ends.

As mentioned above, the processing of step 10 involves a calculation using the inclination at sensor 1 and the inclination at sensor 2. This calculation can be expressed with the following formula (1).

$$XB = Xbt - \Delta Xat \quad (1)$$

Figure 3:
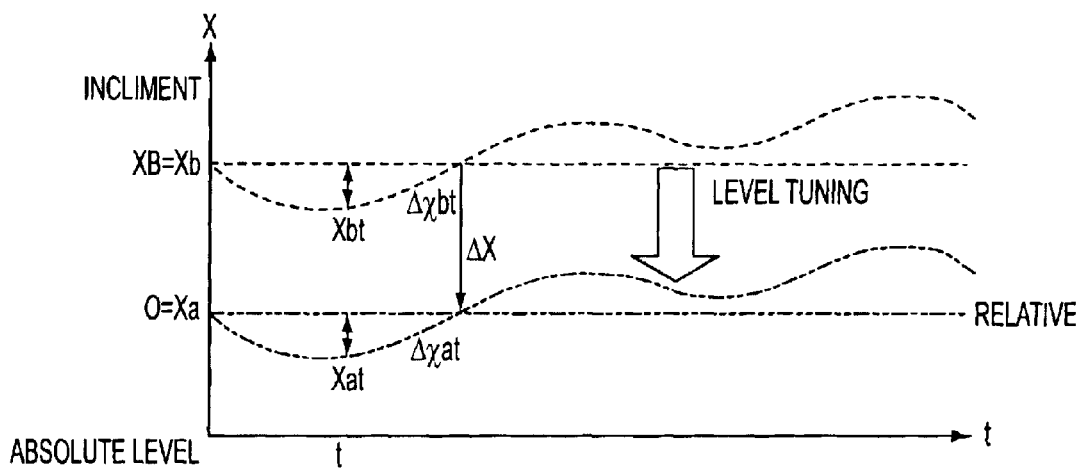
FIG. 3 is a graph of inclination versus time for first and second sensors.

FIG. 3 is a graph of inclination versus time for the first and second sensors. Referring to FIG. 3, XB is a corrected x-axis inclination at point B (location of sensor 2), Xbt is the actual x-axis inclination at sensor 2, and ΔXat is the change in the x-axis inclination at point A (location of sensor 1) since sensor 1 was leveled.

The following formula (2) expresses the corrected inclination XB of the X-axis at point B:

$$XB = (\Delta X + Xat) - \Delta Xat = \Delta X + (Xat - \Delta Xat) = \Delta X + 0 \quad (2)$$

where ΔX is the difference in inclination between sensor 1 and sensor 2 and Xat is the actual inclination at sensor 2. Referring to FIG. 3, ΔX is a constant.

Although the operation is described with respect to X-axis data, operation using y-axis data proceeds the same. Therefore a duplicate description is omitted.

When the change in inclination with time is very large, corrections are performed and CPU 5 determines a corrected inclination at sensor 2. This corrected inclination is output to display 6 as the output data for the sensor 2. When the change in inclination with time is very large, the corrected value is output. When the change in inclination is smaller, the sensor value is output. To perform the correction smaller, the sensor, CPU 5 corrects the value from sensor 2, based on the variation according to time from sensor 1 (ΔXat). ΔXat is therefore a relative value in that it depends on the previous inclination of sensor 1. The correction is expressed with the following formulae (3) and (4):

$$\Delta X = Xb - Xa = Xbt - Xat \neq Xbt - Xa \text{ and } Xa \neq Xat \quad (3)$$

When $Xa = Xat - \Delta Xat$ and when $Xa=0$, as $0 = Xat - \Delta Xat$ then $Xat = \Delta Xat$ (4)

The corrected x-axis inclination for sensor 2 based on the variation ΔXat, can be determined by subtracting ΔXat from the output data Xbt of a sensor 2. That is, as stated in equation (1), XB=Xbt−ΔXat. Therefore, from formula (3) and a formula (4), the following is obtained:

$$XB = (\Delta X + Xat) - \Delta Xat = \Delta X + (Xat - \Delta Xat) \quad (2)$$

Since $Xat - \Delta Xat = 0$ here, $XB = \Delta X + 0$, then $XB = \Delta X + 0 = \Delta X$ (constant value).

Therefore, the value of XB, which relates to the measured value at point B, is stabilized even if the value of Xbt keeps changing. Substantial level adjustment is attained.

That is, when the data from inclination sensor 2 is stored in the buffer 4 at step 9, the output data from inclination sensor 1 may be changing or may have changed. However, CPU 5 produces a corrected inclination for sensor 2 from the output of sensor 1 and the output of sensor 2. This calculation is based on current data from sensor 1, not just the data stored in data buffer 3 at step 4. Therefore, even if the data from inclination sensor 1 changes with time, there is not a big problem.

Figure 4:
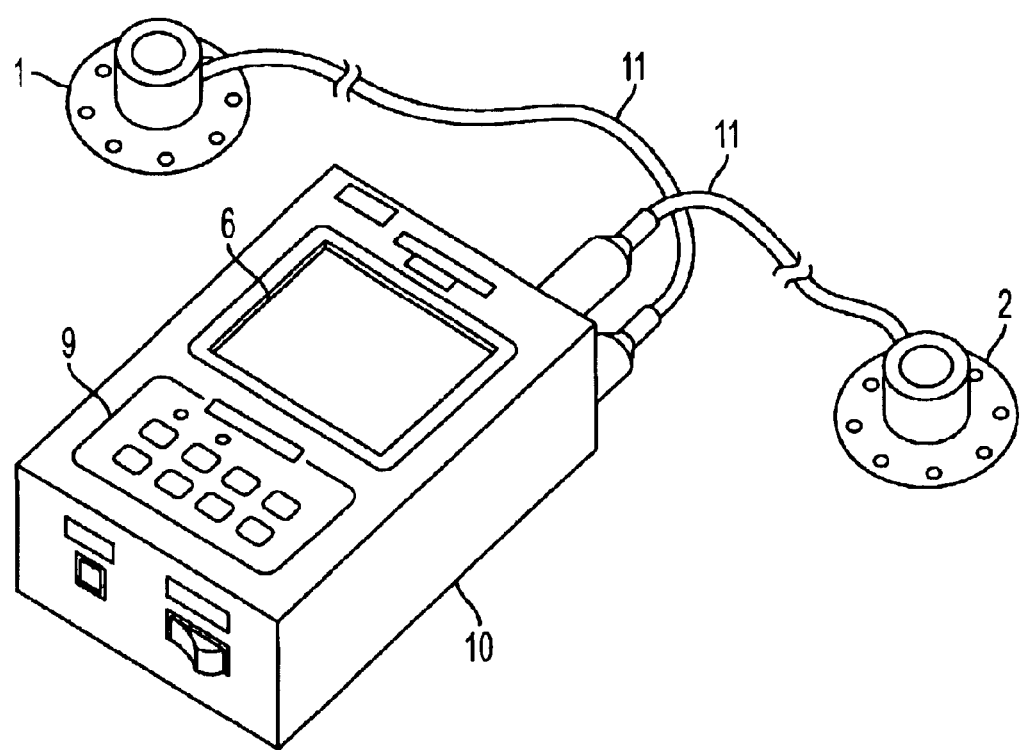
FIG. 4 is a perspective view of an inclination sensor according to a first embodiment of the invention.
Figure 5:
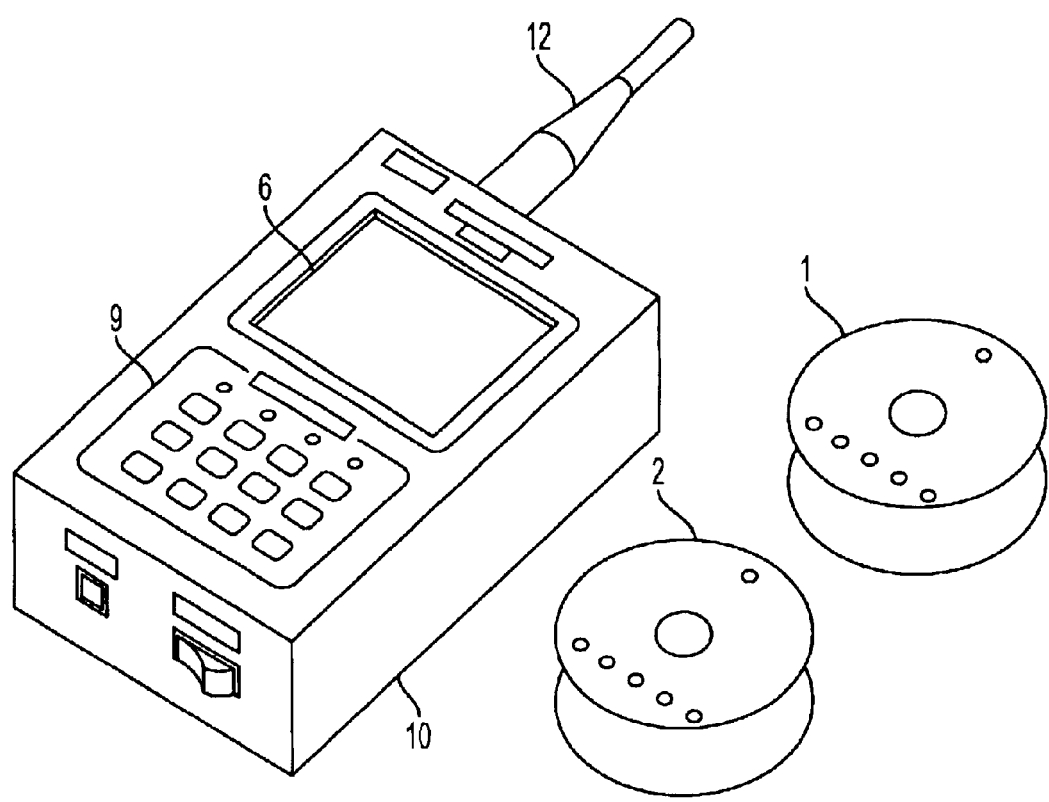
FIG. 5 is a perspective view of an inclination sensor according to a second embodiment of the invention.

FIG. 4 is a perspective view of an inclination sensor according to a first embodiment of the invention, and FIG. 5 is a perspective view of an inclination sensor according to a second embodiment of the invention. In both drawings, the inclination sensor 1 and the inclination sensor 2 are connected to a body 10. This body 10 may have display, calculation, input and output equipment. A cable 11 is used in FIG. 4. In FIG. 5 radio frequency circuits (not shown) are located in each of the sensor 1, the sensor 2 and the body 10. In FIG. 5, an antenna 12 is mounted to the body 10 to perform radio wave data transmission with sensor 1 and sensor 2.

The spirit level described above measures the level of a second location based on the level at a first location. Therefore, even if the inclination at the first and/or second location changes while measuring, the relative inclination of both points can be measured correctly. The spirit level corrects the measured value at the second location using the change in inclination at the first location. The corrected inclination value for the second location is stabilized so that it is easy to adjust the level at the second location. That is a stable display is produced for the user while the user performs inclination adjustments.

The spirit level has inclination sensors, which may be separate from the display/calculation/input/output body. Therefore, the inclination sensors can be installed at narrow locations, to measure easily.

Moreover, because the inclination sensors may be separate from the display/calculation/input/output body (with information transmission via cable or radio frequency), the sensors can be installed at a location remote from large equipment, such as semiconductor fabrication equipment.

The invention has been described in detail with particular reference to preferred embodiments thereof and examples, but it will be understood that variations and modifications can be effected within the spirit and scope of the invention. For example, the invention has been described with respect to two sensors for adjusting the inclination at two locations. However, more than two sensors for adjusting the inclination at more than two locations can also be used.

What is claimed is:

1. A spirit level comprising:
   a first inclination sensor to sense inclination in two directions;
   at least one second inclination sensor to sense inclination in two directions;
   a processing and display unit to:
      display the inclination at the first sensor, while the first sensor is being leveled; and
      after the first sensor has been leveled, display an inclination related to the second sensor such that if the inclination at the first sensor has changed less than a predetermined amount since the first sensor was leveled, then an actual inclination at the second sensor is displayed, and if the inclination at the first sensor has changed more than the predetermined amount since the first sensor was leveled, then a corrected inclination at the second sensor is displayed, the corrected inclination being based on the inclination at both the first and second sensors; and
   communication links connecting the first and second sensors to the processing and display unit to allow the first and a second sensors to move with respect to each other and with respect to the processing and display unit.

2. A spirit level comprising:
   a first inclination sensor;
   at least one second inclination sensor, the first and second inclination sensors being movable with respect to each other and movable with respect to a remainder of the spirit level; and
   a computing module and a display to represent an inclination for the second inclination sensor based on an inclination for the first inclination sensor,
   wherein the inclination for the at least one second inclination sensor is represented based on the inclination for the first inclination sensor only if the inclination at the first inclination sensor has changed greater than a threshold amount.

3. The spirit level according to claim 2, wherein the display represents the inclination for the second inclination sensor as an inclination relative to the inclination at the first sensor.

4. The spirit level according to claim 3, wherein
   at least one of the inclination sensors has a changing inclination, and
   the display represents the inclination for the second inclination sensor based on the changing inclination.

5. The spirit level of claim 4, wherein the inclination sensors are connected to the remainder of the sprit level with a cable.

6. The spirit level of claim 4, wherein the inclination sensors are connected to the remainder of the sprit level with high frequency radio links.

7. The spirit level according to claim 2, wherein
   at least one of the inclination sensors has a changing inclination, and
   the display represents the inclination for the second inclination sensor based on the changing inclination.

8. The spirit level of claim 2, wherein the inclination sensors are connected to the remainder of the sprit level with a cable.

9. The spirit level of claim 2, wherein the inclination sensors are connected to the remainder of the sprit level with high frequency radio links.

10. The spirit level according to claim 2, wherein there are a plurality of second inclination sensors.

11. The spirit level according to claim 2, wherein the first and second inclination sensors each sense inclination in both the x- and y-directions.

12. A method for leveling an object, comprising:
    displaying the inclination at a first sensor, while the first sensor is being leveled; and
    after the first sensor has been leveled, displaying an inclination related to the second sensor such that if the inclination at the first sensor has changed less than a predetermined amount since the first sensor was leveled, then an actual inclination at the second sensor is displayed, and if the inclination at the first sensor has changed more than the predetermined amount since the first sensor was leveled, then a corrected inclination at the second sensor is displayed, the corrected inclination being based on the inclination at both the first and second sensors.

13. The method according to claim 12, further comprising freely positioning the first and second sensors with respect to each other, without also moving a processing and display unit, which displays the inclination.

* * * * *